United States Patent [19]

Ashby

[11] 3,903,047

[45] Sept. 2, 1975

[54] PROCESS FOR THE PRODUCTION OF SILANOL-STOPPED DIORGANO-POLYSILOXANES

[75] Inventor: Bruce A. Ashby, Schenectady, N.Y.

[73] Assignee: General Electric Company, Waterford, N.Y.

[22] Filed: Mar. 20, 1974

[21] Appl. No.: 452,940

Related U.S. Application Data

[63] Continuation-in-part of Ser. No. 408,824, Oct. 23, 1973, abandoned, which is a continuation of Ser. No. 273,392, July 20, 1972, abandoned.

[52] U.S. Cl.. 260/46.5 R; 260/46.5 G; 260/448.7 E
[51] Int. Cl. .......................................... C08f 11/04
[58] Field of Search .... 260/46.5 R, 448.2 E, 46.5 G

[56] References Cited
UNITED STATES PATENTS

| | | | |
|---|---|---|---|
| 2,831,008 | 4/1958 | Knopf et al. | 260/46.5 R |
| 3,309,390 | 3/1967 | Omietanski | 260/46.5 R |
| 3,322,722 | 5/1967 | Eynon | 260/46.5 R |
| 3,375,223 | 3/1968 | Merrill | 260/46.5 R |
| 3,607,899 | 9/1971 | Brown | 260/46.5 R |
| 3,694,405 | 9/1972 | Litteral | 260/46.5 R |

*Primary Examiner*—Melvyn I. Marquis
*Attorney, Agent, or Firm*—Donald J. Voss, Esq.; E. Philip Koltos, Esq.; Frank L. Neuhauser, Esq.

[57] ABSTRACT

A process for producing a silanol chain-stopped diorganopolysiloxane having a viscosity of from 1,000 to 10,000,000 centipoise at 25°C comprising contacting a silanol chain-stopped diorganopolysiloxane reactant having a viscosity of 5 to 900 centipoise at 25°C with a cyclic polysiloxane in the presence of a solid catalyst having active protons thereon.

An alternate process comprises contacting a cyclic polysiloxane with 100 parts per million to less than 2 percent by weight of water in the presence of said solid catalyst to obtain the desired silanol chain-stopped diorganopolysiloxane.

38 Claims, No Drawings

PROCESS FOR THE PRODUCTION OF SILANOL-STOPPED DIORGANO-POLYSILOXANES

BACKGROUND OF THE INVENTION

This application is a continuation-in-part of application Ser. No. 408,824, filed Oct. 23, 1973, and now abandoned which is a continuation of application Ser. No. 273,392, filed July 20, 1972 and now abandoned.

The present invention relates to a process for producing a silanol chain-stopped diorganopolysiloxane and, more particularly, the present invention relates to producing a silanol chain-stopped diorganopolysiloxane having a viscosity of from 1,000 to 10,000,000 centipoise at 25°C by reacting a silanol chain-stopped diorganopolysiloxane of low viscosity with a cyclic polysiloxane or a mixture of cyclic polysiloxanes, or an alternate process by reacting a cyclic polysiloxane with from 100 parts per million to less than 2% by weight of water.

As is known from the prior art, as for instance, patent application of Harvey P. Shaw entitled "Solutions of Room Temperature Vulcanizable Silicone Rubber Compositions" filed on Sept. 28, 1970, and having Ser. No. 76,266, which issued into U.S. Pat. No. 3,701,753 silanol chain-stopped polydiorganosiloxanes with a viscosity of 1,000 to 10,000,000 centipoise are the main ingredients in producing room temperature vulcanizable silicone rubber compositions. Such silanol chain-stopped diorganopolysiloxanes are the main ingredient in both one-package and two-package room temperature vulcanizable silicone rubber compositions.

It was contemplated in the past that such silanol chain-stopped diorganopolysiloxanes can be produced by hydrolyzing a mixture of pure diorganodichlorosilanes with water and then adding a strong base to hydrolyzate hydrolysate and heating it to above 150°C for 2 to 6 hours. During this time there would be formed in the equilibration reaction a large amount of cyclic polysiloxanes. If the reaction mixture was continuously heated after that point, say for another 2 to 6 hours, the cyclic polysiloxanes polymerize further to form a diorganopolysiloxane gum of a very high viscosity. Then water could be added to such a gum or steam could be passed through the gum so as to result in rupture of the siloxane chains in the gum and the formation of silanol groups in the terminal portion of the chain, such that a large proportion of the final product was a silanol-stopped diorganopolysiloxane which could be used as an ingredient in room temperature vulcanizable silicone rubber compositions. Although this procedure could be carried out in the laboratory to produce silanol chain-stopped diorganopolysiloxanes of the desired viscosity, such a procedure was not very feasible in the manufacturing plant. The reason that this procedure could be used in the laboratory was that it was possible to obtain by laboratory procedures a mixture of diorganodichlorosilanes which were essentially pure. Under normal manufacturing procedures, the diorganodichlorosilanes that were produced had a certain amount of impurities in them. More particularly, there was present in such diorganodichlorosilanes up to as much as 0.7 percent or more, such as up to 1.0 percent by weight, of trifunctional chlorosilanes present along with the diorganodichlorosilane, which amount of trifunctional silane could not be removed by ordinary manufacturing purification procedures. In addition, in the diorganodichlorosilanes which were produced by the usual manufacturing procedures, there was present up to 0.3 percent by weight of monofunctional chlorosilanes, which again were undesirable reactants for producing silanol chain-stopped diorganopolysiloxanes. Such monofunctional silanes acted as chain-stoppers, thus, terminating the length of the chain with a trimethylsiloxy group rather than a silanol group as is desired in a silanol chain-stopped diorganopolysiloxane. However, the presence of the trifunctional chlorosilane was even more undesirable. A catalyzed hydrolyzate mixture, when heated at elevated temperatures such as 150°C to 200°C, would result in the formation of cyclics. These cyclics would react with such trifunctional silanes so as to extensively cross-link such that a gel would be formed. In addition, the reaction mixture was not a useful polymer for producing a silanol chain-stopped diorganopolysiloxane, particularly for one-package and two-package room temperature vulcanizable silicone rubber compositions.

In order to cure this deficiency, an alternative procedure was developed by which most of the trifunctional chlorosilane could be removed from the basic diorganodichlorosilane reactant. Thus, as in the previous procedure, such diorganodichlorosilane was hydrolyzed to produce a certain amount of silanol chain-stopped diorganopolysiloxane of a low molecular weight and also certain quantities of cyclic polysiloxanes. To this hydrolyzate, as in the prior procedure, potassium hydroxide was added and the mixture was heated in a temperature range of 100°C to 200°C for 2 to 6 hours. During such heating procedure, the cyclics that were already present in the hydrolyzate, as well as the cyclics that were formed due to the presence of the potassium hydroxide catalyst, were stripped off from the hydrolyzate. Thus, by this procedure, there was obtained an essentially pure mixture of diorgano cyclic polysiloxanes where there may be from 3 to 10 silicon atoms in the cyclic polysiloxane. The cyclic polysiloxanes which are essentially free of the monofunctional silanes, and the trifunctional silanes were then taken and equilibrated in the presence of a strong base catalyst, such as sodium hydroxide or potassium hydroxide, for a period of 2 to 6 hours to produce a diorganopolysiloxane gum of high viscosity, for instance, a viscosity of from above 1,000,000 to up to 30,000,000 centipoise at 25°C. This high viscosity gum was then taken and there was added to it the desired amount of water or steam such that the long molecular chains of the diorganopolysiloxane gum were broken up to form a low viscosity material chain-stopped by silanol groups. Thus, by this long drawn out procedure, it was possible to form a silanol chain-stopped diorganopolysiloxane of the desired viscosity which could be used as an ingredient in one or two-package room temperature vulcanizable silicone rubber compositions.

One difficulty with this process was the formation of the high viscosity gum, which was very difficult to handle. It was very difficult, if not impossible, to make the production of such silanol chain-stopped diorganopolysiloxanes by a continuous process. Several attempts were made to dissolve the diorganopolysiloxane gum in a solvent for use in a contemplated continuous process so as to conserve on equipment and labor. However, the use of a solvent complicates the process and makes it necessary to use special handling equipment and, in addition, creates a fire hazard. Further, in addition, even in a batch process, this prior art process was undesirable since it was very difficult to control the desired end viscosity of the silanol chain-stopped diorganopolysiloxane by the use of steam or the incorporation of water therein. The reason being that the addition of water to the diorganopolysiloxane gum of a high molecular weight caused an erratic drop in viscosity. Thus, it was desired to form a polysiloxane whose viscosity woudl increase after the initial mixing of the reactants by a measurable and controlled amount without going through a high viscosity maximum. In addition, in the foregoing prior art process, the presence of water or even small amounts of water was undesirable until the final step when steam or water was added to the diorganopolysiloxane gum. Since the presence of water or moisture are very readily present in a manufacturing plant, it was desired to develop a process where the presence of water which might incidentally get mixed into the reactants, would not inhibit the process.

However, as was stated previously, the main deficiency in such prior art processes were that they could not be made continuous. Even with the use of solvents, as was explained previously, these prior art processes could not be made continuous since such solvent solutions necessitated prohibitatively expensive equipment of large capacities and also necessitated special safety procedures because of the flammability of such solvents. It was, thus, highly desirable to find a process which would be continuous in the production of silanol chain-stopped diorganopolysiloxanes.

Thus, it is one object of the present invention to provide a process for producing silanol chain-stopped diorganopolysiloxane gum which can be produced economically in a batch process.

It is another object of the present invention to provide a process for producing a silanol-stopped diorganopolysiloxane having a viscosity from 1,000 to 10,000,000 centipoise at 25°C, which process could be semi-continuous.

It is an additional object of the present invention to provide a process for the production of a silanol chain-stopped diorganopolysiloxane polymer having a viscosity from 1,000 to 10,000,000 centipoise at 25°C, which polymer could be made economically by a continuous process.

It is yet another object of the present invention to provide a process for economically producing a silanol chain-stopped diorganopolysiloxane gum useful as an ingredient in the preparation of room temperature vulcanizable silicone rubber compositions.

It is yet another object of the present invention to provide an economical process for the production of silanol chain-stopped diorganopolysiloxane gum, which process would not be affected by the presence of water.

It is still another object of the present invention to provide a continuous process for the production of a silanol chain-stopped diorganopolysiloxane polymer, which process would be both economical and safe to operate.

It is still an additional object of the present invention to provide for a process for producing a silanol chain-stopped diorganopolysiloxane gum having a viscosity of 1,000 to 10,000,000 centipoise at 25°C, wherein there may be present in the reactants to form such a desired reaction product as much as 0.7 weight percent and even as much as 1.0 weight percent of a trifunctional silane.

These and other objects of the present invention are accomplished by means of the process set forth below.

SUMMARY OF THE INVENTION

In accordance with the above objects, there is provided a process for producing a silanol chain-stopped diorganopolysiloxane having a viscosity of 1,000 to 10,000,000 centipoise at 25°C, where the organo groups are selected from the class consisting of monovalent hydrocarbon radicals, monovalent halogenated hydrocarbon radicals and cyanoalkyl radicals, comprising contacting a silanol chain-stopped diorganopolysiloxane reactant having a viscosity of 5 to 900 centipoise at 25°C containing up to 1 percent by weight of trifunctional siloxanes and other impurities such as monofunctional silanes, and up to 80 percent by weight of cyclic siloxanes by contacting such a diorganopolysiloxane reactant with a cyclic polysiloxane of the formula, $$(R_2SiO)_n$$

(1)

where the organic groups and the R radicals are selected from the class consisting of monovalent hydrocarbon radicals, monovalent halogenated hydrocarbon radicals and cyanoalkyl radicals, n varies from 3 to 10, in the presence of a solid catalyst having active protons thereon, in the temperature range of 50°C to 200°C. The cyclopolysiloxane reactant and the silanol chain-stopped diorganopolysiloxane reactants are reacted in the presence of the solid catalyst until equilibrium is reached, that is, until the desired silanol chain-stopped diorganopolysiloxane is formed and is present, in equilibrium with about 12 to 13 percent cyclic polysiloxanes. At that point, the reaction is terminated and the solid catalyst is filtered out. If the catalyst is not filtered out it may be neutralized with a mild base such as, NH₄OH. After the neutralization with such base compounds, such as, NH₄OH, most of the cyclic polysiloxanes are stripped off to result in the desired silanol chain-stopped diorganopolysiloxane as defined above. There may be present as much as 1% by weight of the mixture of trifunctional siloxy units. The presence of this trifunctional siloxy unit does not impede or inhibit the obtaining of the desired silanol chain-stopped diorganopolysiloxane reaction product. The presence of this undesired trifunctional unit does not deter or inhibit the present process for producing the desired silanol chain-stopped diorganopolysiloxane within the viscosity range indicated above.

There may also be present in the silanol chain-stopped diorganopolysiloxane reactant as much as 80 percent by weight of cyclic polysiloxanes. The two reactants are reacted in the desired amount which can easily be calculated by workers skilled in the art, to produce the desired diorganopolysiloxane product of the desired viscosity. The silanol content of the diorganopolysiloxane reactant may vary anywhere from .05% to 10% by weight or more, depending upon the manner in which the low viscosity silanol chain-stopped diorganopolysiloxane is prepared. The final silanol chain-stopped diorganopolysiloxane product desirably has a silanol content of 0.001 to 0.5 percent by weight and, more preferably, from 0.01 to 0.1 weight percent silanol content.

The above process may be carried out in a semicontinuous batch fashion or in a continuous manner. The two reactants may be mixed and passed through a column containing the desired solid catalyst. The catalyst that is mostly used in the invention and which is critical to the present invention constitutes a solid having active protons on it. Another way of defining such a catalyst is a solid having active hydrogen atoms on it. Such catalysts are well known in the art but were not known or contemplated for the above-described process. Thus, any solid which has absorbed on it or has been treated with an acid of a pH below 5 may be used as a catalyst in the present invention. It should be specified that a liquid acid catalyst or a solid pure acid catalyst will not operate in the foregoing process. The preferred process comprises reacting the hydrolyzate containing the cyclic polysiloxanes and the low molecular weight silanol-stopped polysiloxanes in the presence of the catalyst of the process of the present invention without the necessity of adding further amounts of cyclic polysiloxanes so as to obtain the desired reaction product.

In an alternate process, the desired silanol chain-stopped diorganopolysiloxane is obtained by equilibrating the cyclic polysiloxanes of Formula (1) with certain critical amounts of water, that is, 100 parts per million to less than 2 percent by weight of water, based on the weight of the cyclic polysiloxanes at a temperature range of 50° to 200°C. In this alternate process there is utilized essentially pure cyclic polysiloxanes of Formula (1) which cyclic polysiloxanes can be obtained by the methods well known to a person skilled in the art and which methods are set forth in the present specification. In this alternate process it is essential that the catalyst be the same, and the same concentrations as was set forth for the previous process, that is, a solid having active protons thereon.

In addition, as can be seen, the alternate process can be completely batch, semi-continuous or totally continuous.

In some cases under either process it may be desirable to remove the cyclic polysiloxanes remaining after equilibration has been reached without first removing the solid catalyst from the equilibration mixture. Thus, if it is desired to neutralize the solid catalyst after equilibration has been reached in either process, there may be added to the equilibration mixture neutralizing amounts of an additive such as, $NH_4OH$,

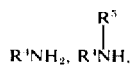

$(R^4)_4NOH$ and $(R^4)_4POH$, where $R^4$ and $R^5$ are selected from the class consisting of alkyl radicals of 1 to 8 carbon atoms, alkenyl radicals of 2 to 8 carbon atoms, cycloalkyl radicals of 4 to 8 carbon atoms, and mononuclear aryl radicals. After such neutralizing agents have been added to the equilibration reaction mixture the excess cyclic polysiloxanes can be stripped at elevated temperatures to have behind the desired silanol chain-stopped diorganopolysiloxanes, having therein the solid catalyst which can then be filtered out or left in the desired product. This neutralization procedure is desirable when the solid catalyst is present or utilized in a loose form in the equilibration reaction mixture rather than when the solid catalyst is used in a packed column, since in the loose form the solid catalyst can only be removed from the equilibration reaction mixture by filtration.

DESCRIPTION OF THE PREFERRED EMBODIMENT

The organic groups in the silanol chain-stopped diorganopolysiloxanes and the R radicals in the cyclic polysiloxane which can include the R radicals of Formula (1) can include, for example, alkyl radicals such as methyl, ethyl, propyl, butyl, octyl; aryl radicals such as, phenyl, tolyl; aralkyl radicals such as, benzyl, phenylethyl; alkenyl radicals such as, vinyl and allyl; cycloaliphatic radicals such as, cyclohexyl, cycloheptyl and cyclohexenyl; haloalkyl and haloaryl such as, chloromethyl, alpha-chloroethyl, beta-chloroethyl, chlorophenyl, dibromophenyl, trifluoromethylphenyl and trifluoromethylpropyl and cyanoalkyl radicals such as, cyanomethyl, beta-cyanoethyl, beta-cyanopropyl, gamma-cyanopropyl, and omega-cyanobutyl. The R radicals in the same silicon atom may be the same or different. This is also true for the organo groups which can be selected from the same radicals as R, the organic groups as will be seen further in the specification, and the R on the same silicon atom may be the same or different.

In one molecule of either the cyclic polysiloxane of Formula (1) or the silanol chain-stopped diorganopolysiloxane, the R radicals and organo radicals on the same molecule may be the same or may be different as chosen from the various above-defined radicals. Thus, the R groups on the same silicon atom may be the same or different such as, methyl, phenyl and the silanol chain-stopped diorganopolysiloxane reactant or the reaction product can have dimethyl-diphenyl substituents, methylphenyl substituents, and other groups bonded to the silicon atom of the chain.

The radicals $R^4$ and $R^5$ in the neutralizing additive may generally be selected from the class consisting of monovalent hydrocarbon radicals, halogenated monovalent hydrocarbon radicals and cyanoalkyl radicals. Preferably the $R^4$ and $R^5$ radicals are selected from the class consisting of alkyl radicals of 1 to 8 carbon atoms, alkenyl radicals of 2 to 8 carbon atoms, cycloalkyl radicals of 4 to 8 carbon atoms and mononuclear aryl radicals such as, phenyl, methylphenyl, etc.

The preferred substituent groups for the organic groups of the silanol chain-stopped diorganopolysiloxane reactant, as well as the diorganopolysiloxane reaction product, that is, the one having a viscosity of 1,000 to 10,000,000 centipoise at 25°C, are preferably selected from lower alkyl of 1 to 8 carbon atoms, such as, methyl, ethyl, mononuclear aryl radicals such as, phenyl and lower alkenyl radicals such as, vinyl and allyl. The silanol chain-stopped diorganopolysiloxane reactant, that is, one having a viscosity of 5 to 900 centipoise at 25°C, preferably has the formula, (2) 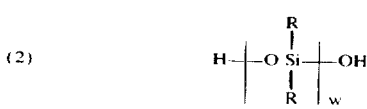

where R is as previously defined and w is a whole number that varies from 2 to 500. Preferably, the silanol chain-stopped reactant of about 5 to 900 centipoise has the structure of Formula (2). It is preferred that as much of this compound as possible be in the reactant. However, there may be mixed with such a silanol chain-stopped diorganopolysiloxane as much as 80 percent by weight of cyclic polysiloxanes, which polysiloxanes can be left in or used in the process along with the silanol-stopped polysiloxane of Formula (2). In the alternative, it is possible that mixed in with the silanol chain-stopped diorganopolysiloxane of Formula (2) above, there be present only 20 percent and, more preferably, only 10% by weight of such cyclic polysiloxanes. Of course, mixed in with the silanol chain-stopped diorganopolysiloxane of a viscosity of 5 to 900 centipoise at 25°C, there may even be present as much as 1 percent by weight of the trifunctional silanes. Such trifunctional silane units have the formula $RSiO_{3/2}$, where R is as previously defined. There may also be present minor amounts of monofunctional units, that is, $R_3SiO_{1/2}$ units, mixed in with the silanol-stopped fluid. There may also be present trace amounts of other undesirable impurities. However, these undesirable impurities will not in any way inhibit the process of the present invention.

The cyclic polysiloxanes that are present with the silanol chain-stopped diorganopolysiloxane reactant of Formula (2), may be removed so as to result in silanol chain-stopped diorganopolysiloxane of Formula (2) which is essentially free of cyclic polysiloxanes. If the cyclic polysiloxanes are present with the silanol chain-stopped fluid reactant, their presence will not affect the reaction of the present invention. The only affect of the presence of such cyclic polysiloxanes will be that it will not be necessary to add as much cyclic polysiloxanes of Formula (1) to the reaction mixture as would normally be required in the case where the silanol chain-stopped diorganopolysiloxane was substantially free of cyclic polysiloxanes.

The cyclic polysiloxanes mixed in with the silanol chain-stopped diorganopolysiloxanes of Formula (2) above are basically of the same type as those of Formula (1) above, that is, they have the formula, $$(R'_2SiO)_x \quad (3)$$

where R' may be the same radicals as that which were defined for R and x varies from 3 to 10. Such cyclic polysiloxanes of Formula (3) are normally mixed in with the silanol chain-stopped diorganopolysiloxane of Formula (2) above as a result of the hydrolysis procedure by which the silanol chain-stopped diorganopolysiloxane of Formula (2) is obtained.

In the same way the final product from the present process, that is, the silanol chain-stopped diorganopolysiloxane having a viscosity of 1,000 to 10,000,000 centipoise at 25°C, preferably has the formula,

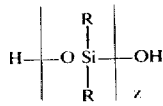

(4)

where R is as previously defined and z varies from 500 to 7,000, there being present with the product having the above formula, minor amounts of $R_3SiO_{1/2}$ units with as much as 1 percent by weight of such monofunctional and $RSiO_{3/2}$ tri-functional units. In addition, there may also be present a small amount, say up to 1 percent by weight or more, of $(R_2SiO)_x$ units in the final fluid product, where the R radical is as previously defined and X varies from 3 to 10, which units may represent cyclic polysiloxanes. Preferably, the final silanol chain-stopped diorganopolysiloxane product of Formula (4) above has a silanol content of 0.001 to 0.5 percent by weight and, more preferably, a silanol content of 0.01 to 0.1 percent by weight. The silanol chain-stopped reactant of Formula (2) above may have as little as 0.2% silanol content by weight and may have as much as 10 or more percent by weight of silanol content. With a simple, well-known acid hydrolysis process, there is normally obtained a silanol chain-stopped reactant of Formula (2) above, having a silanol content of from 0.05 to 0.5 percent by weight. In the case where a base hydrolysis is used, that is, with sodium bicarbonate, the silanol content reactant may be as high as 10 percent by weight.

In the process, and particularly the acid hydrolysis process, for producing the silanol chain-stopped fluid reactant of Formula (2) above, there is normally utilized a halogen silane of the formula $R_2SiX_2$, where R is as previously defined and X is selected from halogen and, more preferably, chlorine. This diorganodichlorosilane or dihalogenosilane as obtained by commercial methods, normally contains about up to 0.7 percent and as much as 1.0 percent by weight of $RSiX_3$ silanes, which trifunctional silanes are undesirable but, nevertheless, are part of the impurities in accordance with the commercial process for producing diorganodihalogenosilanes.

There may also be present minor amounts of a monofunctional silane of the formula $R_3SiX$, where R and X is as previously defined. In addition, there may be minor amounts of other halogenosilanes present as impurities, such as $SiX_4$, where X is previously defined, or hydrochlorosilanes, which total amount of such reactants can be present with the diorganodihalogenosilane inasmuch as 1 percent or 2 percent by weight. More particularly, the tetrafunctional silanes are not present in the commercially prepared diorganodihalogenosilane in a concentration of more than 0.5 weight percent.

The avove diorganodihalogenosilane, and preferably the diorganodichlorosilane, is poured into water where there is generally present 1 part of the diorganodihalogenosilane per 2 to 3 to as much as 6 parts of water. Before the diorganodichlorosilane is added to the water, the water is diluted with hydrochloric acid or, for that matter, any other strong acid. Sufficient acid is added so as to maintain the pH of the solution in the range of 0.1 to a pH of 5. Thus, to the dilute acid solution which is warmed by the pouring of the acid, preferably hydrochloric acid to water, there is added 1 part of the diorganodihalogenosilane per 2 or more parts and as much as 6 or more parts of water. Although a solvent is not necessary in this hydrolysis process, a solvent can be used. Thus, for instance, the diorganodihalogenosilane may be dissolved in a common inert hydrocarbon solvent and the solution thereof may be added to the dilute water-acid mixture. Examples of solvents that can be used are such solvents as xylene, toluene, benzene, cyclohexane, heptane, octane, and mineral spirits.

The organohalogenosilane, whether dissolved in a solvent or not, is poured into the dilute acid-water mixture with agitation. The hydrolysis is carried out at room temperature or slightly above room temperature, such as between 25°C and 50°C. It is also possible to carry out the hydrolysis below room temperature.

The organohalogenosilane is added to the dilute acid-water mixture with agitation over a period that may vary from 30 minutes to 2 hours. After the addition step has been completed, the organohalogenosilane hydrolyzate is allowed to settle such that there separates a silicone layer with or without the particular solvent, and the acid-water layer. The acid-water layer is removed from the reaction area. Then the solvent silicone hydrolyzate layer is washed two or three times with equal quantities of water so as to remove any hydrogen chloride or any other type of acid that may be entrapped in the silicone layer. Thus, this silicone layer, with or without the solvent, is washed several times with the necessary quantity of water until the silicone layer is about neutral and there is less than about 5 parts per million of hydrogen chloride in the silicone hydrolyzate layer.

At this point, this hydrolyzate is composed of the silanol chain-stopped diorganopolysiloxane reactant of Formula (2) above, and as much as 80 percent by weight of the cyclic siloxanes. As mentioned previously, there are also present minor amounts of the trifunctional siloxy units, minor amounts of the tetrafunctional siloxy units and minor amounts of the monofunctional siloxy units identified previously. Thus, while cyclics may be present at a concentration as high as 80 percent by weight, it is also true that in such a reaction product hydrolyzate there may be present as little as 18 percent by weight of the silanol chain-stopped polysiloxane fluid. Such a hydrolyzate can then be immediately used in the basic reaction of the present invention. On the other hand, it may be desired to strip off most, if not all, of the cyclic material, as well as the solvent for the second phase of the reaction. Such cyclic polysiloxanes may or may not be stripped off from the hydrolyzate so as to yield a substantially pure silanol chain-stopped diorganopolysiloxane fluid of Formula (2) above, with minor amounts of the other impurities and by-products indicated previously, that is, the monofunctional and trifunctional units, as well as trace amounts of tetrafunctional units.

If desired, the cyclics that are present in the hydrolyzate may be used in the main process of the present case directly, that is, by reacting the hydrolyzate without stripping off the cyclic polysiloxanes and without stripping off the solvent, if a solvent was used in the hydrolysis. It should be noted that with this hydrolysis procedure, there is obtained a silanol chain-stopped diorganopolysiloxane reactant of Formula (2) above having a viscosity between 5 to 900 centipoise at 25°C and having a silanol content of between 0.05 and 10 percent by weight of fluid.

Another hydrolysis procedure that may be used to form the silanol chain-stopped diorganopolysiloxane reactant of the present invention is the sodium bicarbonate process. This process comprises pouring the diorganohalogenosilane reactant into water containing sodium bicarbonate dissolved in it. Preferably, there is reacted one part of the diorganohalogenosilanes with the various impurities therein with up to 2 or more parts of the water-sodium bicarbonate mixture. Preferably, the water has dissolved in it 5 to 25 by weight of sodium bicarbonate in it. In this hydrolysis procedure, any other weak base can also be used. The organohalosilanes may again be added to the water-sodium bicarbonate mixture after being dissolved prior to the addition in acetone or one of the common inert hydrocarbon solvents disclosed with respect to the prior acid hydrolysis. These diorganodihalogenosilanes are added over a period of 30 minutes to 2 hours to the water-bicarbonate solution with constant agitation. After the addition of the diorganohalogenosilane has terminated, then the hydrolyzate mixture is continued to be agitated for 15 minutes. At the end of the 15 minute period, which may vary as desired, the silicone layer with or without an organic solvent is allowed to separate from the water-sodium bicarbonate layer and after standing for about a two hour period so that the two layers have completely separated, the sodium bicarbonate-water layer is separated from the silicone layer. The silicone layer is then washed several times with equal amounts of water and with agitation to remove as much as possible any sodium bicarbonate that might be in it and to more particularly remove any acid that was formed in the hydrolysis from the silicone layer and not neutralized by the base. Preferably, the silicone layer does not have more than 5 parts per million of hydrochloric acid or any other type of acid in it, the reason for this being that the presence of more than trace amounts of acid tends to have an undesirable affect on the desirable properties of the silanol chain-stopped diorganopolysiloxane formed in the reaction. Using this hydrolysis procedure, there is obtained a silanol chain-stopped diorganopolysiloxane having a viscosity between 5 to 900 centipoise at 25°C and having generally the structure set forth in formula (2) above. As with the previous hydrolysis, there will be present in this hydrolyzate minor amounts of the trifunctional siloxy units, minor amounts of monofunctional siloxy units and minor amounts of difunctional siloxy units, such as up to 1% of such units, which are bonded to the trifunctional and to the monofunctional units. However, in this type of hydrolysis there is a much smaller percentage of cyclic polysiloxanes of Formula (3) above. Thus, in this type of hydrolysis, there is only present 40 percent by weight or less of the cyclic polysiloxanes of Formula (3) above. In this particular hydrolysis, that is, the sodium bicarbonate hydrolysis, there may be present as much as 50 percent by weight or more of the hydrolyzate of the silanol chain-stopped diorganopolysiloxane reactant fluids of Formula (2) above. In addition, utilizing this hydrolysis procedure, the hydrolysis fluid and, more particularly, the silanol chain-stopped diorganopolysiloxane of Formula (2) above, contains more than 1 percent by weight of silanol groups thereon and may contain as much as 5 to 10 percent by weight of silanol groups thereon or possibly even a higher weight percent of silanol groups. Thus, after the silicone layer is separated from the acid-water-bicarbonate layer, the silicone layer is washed several times with equal volumes of water so as to remove all but trace amounts of acid from the silicone hydrolyzate product. Then the hydrolyzate product having the composition as explained above may be taken and the solvent stripped from the silicone layer in a manner well known in the art. In addition, all or most of the cyclics may also be stripped off from the hydrolyzate product so as to be essentially a silanol chain-stopped diorganopolysiloxane fluid reactant of Formula (2) above essentially free of cyclic polysiloxanes of Formula (3) above. However, such a stripping procedure is not necessary, that is, either the cyclics or the solvent in the hydrolyzate may be used in the basic process and basic reaction of the present invention. One of the main advantages of the present process is that such impurities such as the monofunctional siloxy units or the trifunctional siloxy units, as well as trace amounts of tetrafunctional siloxy units, will not inhibit the basic process of the present invention for formina a silanol-stopped reaction product of Formula (4) above. These various types of cyclic polysiloxanes having the desired organic substituents thereon, which organic substituent groups are desired in the final silanol chain-stopped diorganopolysiloxane reaction product of the present invention may then be mixed together and used in the basic reaction of the present invention, that is, the reaction for producing the silanol chain-stopped diorganopolysiloxane of Formula (4) above.

Thus, by the above procedure, there is obtained either a single particular cyclic polysiloxane within the scope of Formula (1) above or a mixture of cyclic polysiloxanes within the scope of Formula (1) above. These cyclic polysiloxanes within the scope of Formula (1) above are then taken and mixed with the low viscosity silanol chain-stopped diorganopolysiloxane of Formula (2) above in the proportions desired, depending upon the viscosity of the low molecular weight silanol-stopped fluid, and also depending on the amount of cyclic polysiloxanes that are mixed in or present with the low viscosity silanol-stopped fluid. As an example, in the case where there is present a silanol-stopped low viscosity fluid of Formula (2) above essentially free of cyclic polysiloxanes having a viscosity of 5 to 500 centipoise at 25°C, which silanol-stopped fluid contains about up to 1 percent by weight of the trifunctional siloxy units and up to 1 percent of the monofunctional siloxy units and various other impurities or by-products of the hydrolysis procedure, then such a silanol-stopped low viscosity fluid which is essentially free of cyclic polysiloxanes is reacted at a concentration of 1 part of such a fluid with 180 to 600 parts of cyclic polysiloxanes of Formula (2) above so as to produce the desired silanol chain-stopped diorganopolysiloxane product of the present invention.

It should be, of course, obvious that the above parts of the various reactants is a general statement and may vary somewhat for a particular type of reactant. Thus, the amount of cyclic polysiloxanes of Formula (1) above will be added to the reaction mixture and will depend on the amount of cyclic polysiloxanes that are mixed with the low viscosity silanol chain-stopped fluid. In addition, the amount of cyclic polysiloxanes therein will vary depending upon the viscosity of the silanol chain-stopped fluid and on the final desired viscosity of the silanol-stopped diorganopolysiloxane product of the present invention, that is, one having a viscosity of between 1,000 to 10,000,000 centipoise at 25°C.

The low viscosity silanol-stopped fluid of the present invention is reacted with the cyclic polysiloxanes in the presence of a solid catalyst having active protons on it. It should be noted that the critical part of the present invention is the use and type of catalyst as set forth above, that is, the use of a solid catalyst having active protons in it. Another way of defining the type of catalyst is a solid catalyst having active hydrogen atoms on it, such as clay treated with sulfuric acid. For instance, there is suitable in the present invention, that is, in a reaction between the low viscosity silanol-stopped fluid and the cyclic polysiloxanes as a catalyst any solid which has been treated with sulfuric acid. As pointed out, this is the critical part of the present invention because a solid acid such as toluene sulfonic acid which is a normal catalyst in equilibration reactions will not work in this reaction. Only a solid on which there is absorbed an acid and particularly a solid treated with any acid having a pH below 5, will work as a catalyst in the present invention. Any solid treated with sulfuric acid will be found suitable as a catalyst in the present invention but liquid sulfuric acid in any concentration will not operate as a catalyst in the present invention. In addition, the common strong bases that are found useful in the formation of gums, such as potassium or sodium hydroxide, are useless in the present invention. Thus, as pointed out before, out catalyst can be described as a solid having active protons on it or as a solid that has active hydrogen atoms on it or as a solid that has been treated with an acid having a pH below 5. Thus, ion-exchange resins can be used as a catalyst in the present invention. Synthetic resins, such as sulfonated polystyrenes, may also be used as a catalyst in the present invention. Acid-activated carbon and acid-activated clays, such as montmorillonite, can be used in the present invention. The preferred acid-activated clay is montmorillonite, an example of which is Filtrol, manufactured by Filtrol Corporation of Los Angeles, California, which is a particular type of acid-activated montmorillonite. The particular advantages of Filtrol and other acid-activated solid catalysts is that they do not impart any acidity to the reactants or to the reaction product. Accordingly, after the reaction is completed with the use of Filtrol, the Filtrol is simply removed or separated from the reactants and there is no need for neutralizing the reaction product that is formed in this reaction.

Other examples of catalysts, which solid catalysts have active protons thereon, which may be used in the present invention are as follows: Florida Earth, Kambara Earth, sulfuric acid-treated carbon montmorillonites, sulfuric or hydrochloric acid treated halloysite, beidellite illite, Filtrol-20, Filtrol-24, Filtrol-25 (trademarks of acid treated clay manufactured by the Filtrol Corporation, Los Angeles, California); natural zeolites, natrolite, analcime, stilbite, chabazite, mordenite, clinophilolite, glauconite (green sand); synthetic zeolites, Zeolon Series (tradenames of synthetic mineral cation exchange resins sold by Norton Co.), Permutit (tradename of synthetic mineral cation exchange resins manufactured by Permutit Co.), bentonite, kaolinite (China Clay), alumino-silicates, Fuller's Earth, acidified carbon, Dowex-charcoal, sulfonated coal, sulfonated polystyrene, acid forms of Dowex 50 (manufactured by Dow Chemical Co.), Amberlyst-15 (manufactured by Rohn & Hass), Ionac C-242 (manufactured by Ionac Co.), Duolite C-20 (manufactured by Diamond Alkali).

The solid acid catalyst is preferably used in the reaction between the low viscosity silanol chain-stopped fluid and the cyclic polysiloxanes at a concentration of 0.1 to 50 percent by weight or more by volume. As will be explained further on, when the process is a batch process, the solid catalyst may be present at a concentration of as low as 0.1 to 5 or 10 percent by volume of the reaction mixture. On the other hand, when a continuous or semi-continuous process is used where the reactants are passed through a column of Filtrol or other solid acid catalyst, then the volume of the Filtrol as with respect to the volume of reactants in the column or reaction may be as high as 50 to 90 percent by volume or more. As stated in terms of weight percent, the concentration of the acid-activated solid catalyst may be present at a concentration of 0.1 to 75 percent by weight of the reaction mixture. Thus, as in the above discussion, when the reaction is a batch type of reaction, the catalyst may be present in a concentration as low as 0.1 to 5 percent by weight. However, when there is a continuous process in which the reactants are passed through a column packed with the solid acid catalyst, the solid acid catalyst packing in the column may be present at a concentration as high as 75 percent by weight, based on the weight of the reactants. However, it must be appreciated that the concentration of the solid acid catalyst in the reaction area may be as much as 90% by volume or more or may be as high as 90 percent by weight. Other hydrolysis processes may be used to form the silanol chain-stopped diorganopolysiloxane fluid reactant of Formula (2) above. Such processes are, for instance, described in the following publications: S. W. Kantor, J. Amer. Chem. Soc. 75 2712 (1953) By Hydrolysis of Dimethyldiethoxysilane in Hot Water; W. Patnode, D. F. Wilcock, J. Amer. Chem. Soc. 68 358 (1946) By Hydrolysis of Dimethyldichlorosilane in Water Gives Equal Quantities of Cyclics and HOMe$_2$Si(OSiMe$_2$)$_x$OSiMe$_2$OH; P.D. George, L. H. Sommer, F.C. Whitmore, J. Amer. Chem. Soc. 75 1585 (1953) Hydrolysis of Ether Solution of Et$_2$SiCl$_2$ in Water Gives Polydiethylsiloxanols; and W. A. Schwenker (G.E.) U.S. 2,758,124 Continuous Hydrolysis of Me$_2$SiCl$_2$ to Give Mixture of Cyclics and Silanols.

Irrespective of the hydrolysis process that is used and irrespective of the concentration in the hydrolyzate of the silanol chain-stopped diorganopolysiloxane reactant of Formula (2) above and the concentration in the hydrolyzate of the cyclic polysiloxanes of Formula (1) above, such a hydrolyzate may be used in the basic process of the present invention. It should be noted at this point that the hydrolysis procedure utilizing sodium bicarbonate and, in fact, most hydrolysis procedures, are carried out at a temperature slightly below room temperature or, for that matter, somewhat above room temperature, that is, a temperature of 20°C to 50°C. Although lower temperatures can be used in either type of hydrolysis and most hydrolyses, such lower temperatures are not desired because of the need for refrigeration. On the other hand, temperatures above 50°C are not desirable since such elevated temperatures may possibly cause some of the diorganohalogenosilane reactant to evaporate before it has been hydrolyzed. As stated previously, the hydrolyzate, either from the acid hydrolysis or any other type of hydrolysis, such as the sodium bicarbonate hydrolysis, produces a mixture of low viscosity silanol chain-stopped diorganopolysiloxanes, and cyclic polysiloxanes of the formula of (1) above. This hydrolyzate mixture may then be exposed to the novel catalyst of the present invention and heated at a temperature such that the desired silanol chain-stopped diorganopolysiloxane reaction product of the present invention is obtained, that is, a reaction product having a viscosity between 1,000 to 10,000,000 centipoise at 25°C. Thus, if it is desired to produce as a final product a low viscosity silanol chain-stopped diorganopolysiloxane, say a final product having a viscosity of 1,000 centipoise, the cyclics that are present in the hydrolyzate mixture may be used to react with the low viscosity silanol chain-stopped fluid. On the other hand, if the amount of the cyclic polysiloxanes present in the hydrolyzate are not sufficient to form the desired high molecular weight silanol-stopped diorganopolysiloxane reaction product, that is, one having a viscosity of about 100,000 centipoise at 25°C, then it will be necessary to add to the hydrolyzate the necessary amount of cyclic polysiloxanes as defined in Formula (1) above. More preferably, it is desired to produce silanol chain-stopped diorganopolysiloxane of a viscosity varying from 1,000 to 100,000 centipoise at 25°C since the silanol chain-stopped reaction products which fall within the latter viscosity range are the most preferred viscosity range and are more desirable for most room temperature vulcanizable silicone rubber compositions.

Preparation of the cyclic polysiloxanes of Formula (1) above which contain both saturated and olefinically unsaturated hydrocarbon groups, may be carried out by any of the procedures well known to those skilled in the art. Such polysiloxanes can be produced by following the procedure involving hydrolysis of one or more hydrocarbon substituted dichlorosilanes of which the substituents consist of saturated and/or unsaturated hydrocarbon groups. Thus, the diorganodihalogenosilanes are added to an acid-water mixture so that there may be a hydrolyzate produced. This procedure is the same as that used to produce the low viscosity silanol chain-stopped diorganopolysiloxane which is one of the basic reactants of the present invention. Thus, the diorganodihalogenosilanes are added to an acid-water mixture slowly over a period of 30 minutes to 2 hours with constant agitation and, at the end of that time, the agitation is continued for 15 minutes more. As stated previously, the diorganodihalogenosilanes may be dissolved in a solvent and added to the acid-water mixture. The hydrolysis reaction may be carried out at any temperature between 20°C to 50°C. After the hydrolysis is complete, then there is present in the hydrolyzate a mixture of cyclic polysiloxanes and a silanol chain-stopped diorganopolysiloxanes. To the crude hydrolyzate there is then added a strong base catalyst such as potassium hydroxide, cesium hydroxide, lithium hydroxide or sodium hydroxide. Preferably, there is added from 1 to 5 percent of the strong base to the hydrolyzate. The hydrolyzate is then heated at a temperature in the range of 125°C to 175°C for a period of time varying from 2 to 4 hours, during which period a number of reactions occur. The silanol groups are condensed to produce siloxane linkages and water. In addition, an equilibration is set up which produces a mixture of the cyclic siloxanes of Formula (1) above. Thus, in the most preferred process, the hydrolyzate with the base catalyst is heated to a temperature of about 150°C until equilibration is reached wherein there is being formed a maximum amount of cyclic polysiloxanes. At the end of this period, the reaction mixture is heated to a temperature of about 200°C and all of the cyclic polysiloxanes are stripped off and collected in the appropriate receiver.

In particular, in the more preferable process, when the hydrolyzate is heated with a base catalyst at a temperature of 150°C or over, the cyclic polysiloxanes are continually distilled off and collected until the hydrolyzate has produced the maximum amount of cyclic polysiloxanes, which are continually collected. This procedure of drawing off the cyclic polysiloxane as they are formed results in the production of as much cyclic polysiloxanes as is possible. Such cyclic polysiloxanes which are collected from this equilibration and stripping procedure are essentially pure and free of trifunctional units.

Thus, in order to depolymerize the crude hydrolyzate that is formed, there is added to the hydrolyzate a catalyst and the mixture is heated at a temperatue of over 150°C to produce and recover by distillation a product consisting of low molecular weight cyclic polysiloxanes of Formula (1) above, comprising about 85 percent of a cyclic polysiloxane having four silicon atoms and 15 percent of mixed cyclic polysiloxanes having three silicon atoms and five silicon atoms.

It can be appreciated that in the basic reaction of the present case, the solid catalyst concentration in the reaction area may be as high as 75 percent or more by weight of the reaction area or may be present at a concentration as high as 90 percent by volume or more of the reaction area. It should be obvious, of course, that either the low viscosity silanol chain-stopped fluid reactant or the cyclic polysiloxane reactant may be first dissolved or be present in a solvent when these reactants are brought into contact with each other. It should be mentioned that such a solvent is not desirable particularly at this stage of the process, since it may create a fire hazard and adds additional steps to the process. If a solvent is used, any of the inert hydrocarbon solvents mentioned previously may be used to dissolve the cyclic polysiloxane reactant of the low viscosity silanol-stopped fluid reactant.

The basic reaction, preferably, occurs at a temperature range varying from 50°C to 200°C. At 50°C it may take as long as 48 hours for the reaction to reach completion. At 180°C, on the other hand, it takes only 90 minutes or less for the reaction to reach completion. Although you can operate at a temperature above 200°C to some extent, some undesirable side products are obtained at this elevated temperature and it is not preferred in the reaction of the present case. Most preferably, the reaction should be carried out at a temperature of 120°C to 150°C in a period of two hours or less.

It should be noted that in this basic reaction, the presence of any water that might accidently become mixed with the reactants will not affect the reaction nor inhibit the catalyst. In addition, none of the trifunctional or monofunctional or other type of impurities that might come into the reaction zone with the low viscosity silanol chain-stopped fluid or with the cyclic siloxanes will impede the reaction. Since the reaction proceeds at a measured rate from a lower viscosity to a higher viscosity silanol-stopped material, it can be terminated at any point with the desired silanol chain-stopped diorganopolysiloxane product.

In the basic reaction of the present case, there is an equilibration reaction such that when the reaction is completed there will be present the silanol chain-stopped diorganopolysiloxane reaction product of the present invention having a viscosity varying from 1,000 to 10,000,000 centipoise at 25°C. When the equilibrium has been reached in the reaction, there will be less than 13% by weight of cyclic polysiloxanes. In equilibrium with the silanol-stopped reaction product of the present invention, there will be present the trifunctional, monofunctional, as well as other types of impurities mentioned previously. These impurities will not effect or detract from the progress of the process. After equilibrium has been reached or during any time in the reaction process where a silanol fluid of the desired viscosity is obtained, the solution is cooled. If the type of solid catalyst used has imparted acidity to the reaction product, there is added to the reaction mixture a sufficient amount of a weak base such as sodium bicarbonate so as to neutralize the acid. After such neutralization procedure, or if such neutralization procedure is not necessary, the reaction mixture is filtered so as to separate the solid catalyst from the reaction mixture. If there is present a solvent, or if it is desired to separate the cyclic polysiloxanes from the silanol chain-stopped reaction product, the reaction mixture is heated to a temperature in excess of 200°C, so as to strip off the cyclics and other impurities, as well as any solvent. For room temperature vulcanizable silicone rubber compositions, it is desirable to strip off all the solvent if a solvent was used, and most of the cyclic polysiloxanes which are present in the reaction mixture, as well as any other impurities that may be present so as to result in a silanol chain-stopped diorganopolysiloxane reaction product having a viscosity between 1,000 to 10,000,000 centipoise or, more preferably, between 1,000 to 100,000 centipoise at 25°C, which reaction product has less than 1.0 weight percent of cyclic polysiloxanes.

The desirable silanol chain-stopped diorganopolysiloxanes can also be produced by an alternate process. This alternate process comprises reacting cyclic polysiloxanes of Formula (1) above in essentially pure form with anywhere from 100 parts per million to less than 2% by weight of water, that is, the reaction mixture consists of the cyclic polysiloxanes of Formula (1) above in essentially pure form in combination with water. These two reactants are contacted and reacted until equilibration is reached in the presence of one of the critical solid catalysts of the present invention. Preferably, there may be used anywhere from 0.05 percent by weight to less tha 2 percent by weight of water based on the cyclic polysiloxanes of Formula (1). If less than 100 parts per million of water is used in the equilibration reaction, then the desirable silanol chain-stopped diorganopolysiloxane is of too high a viscosity. If 2 percent by weight or more than 2 percent by weight of water is utilized in the equilibration reaction mixture of this alternate process, for some unknown reason, the desired silanol chain-stopped diorganopolysiloxane polymer is obtained at a very poor yield, that is, at equilibration there is less than 80 percent of the cyclic polysiloxanes of Formula (1), converted to the desired silanol end-stopped diorganopolysiloxane polymer of a viscosity of 1,000 to 10,000,000 centipoise at 25°C.

Accordingly, it is critical to this alternate process that there be present less than 2 percent by weight of water based on the cyclic polysiloxanes of Formula (1) above. Thus, by this alternate process by controlling the amount of water as indicated above and reacting these amounts of water with the cyclic polysiloxanes of Formula (1) above, in the presence of the critical solid catalyst of the present invention which were defined previously, there can be obtained the desired silanol chain-stopped diorganopolysiloxane of Formula (4) above, which has a silanol content of anywhere from 0.001 to 0.5 percent by weight. Accordingly, in a more preferred embodiment, there is preferred to be utilized anywhere from 0.05 percent by weight to less than 2 percent by weight of water in contact with the cyclic polysiloxanes of Formula (1) above. The desired silanol chain-stopped diorganopolysiloxane of Formula (4) is present at above 80 and 85 percent by weight in the equilibration reaction mixture after the water and cyclic polysiloxanes of Formula (1) have reached the equilibration point. The reaction is carried out at a temperature range of anywhere from 50° to 200°C and preferably at a temperature range of 150° to 200°C. The reaction time in this case as with the previous process, may vary anywhere from 1½ hours to 48 hours depending on the temperature of reaction and the amount of solid catalyst that is utilized in the reaction mixture. As was pointed out with the previous process, there may be utilized anywere from 0.1 to 75 percent or more by weight of the catalyst based on the cyclic polysiloxanes of Formula (1) above, and water. Also, in the same vein there may be utilized anywhere from 0.1 percent by volume to 90 percent by volume or more of the solid catalyst based on the weight of cyclic polysiloxanes and water in the reaction mixture.

It can be imagined that when the solid catalyst of the present case is utilized in a packed column, the packed column can be such so that 90 percent of the volume of the reaction area is constituted by the solid catalyst of the present case. Any of the solid catalysts enumerated for the previous process can be utilized in the present alternate process.

The cyclic polysiloxanes of Formula (1) above, for use in this alternate process can be obtained by any of the methods known to a worker skilled in the silicone art and more specifically can be obtained by the procedures set forth above with respect to obtaining the cyclic polysiloxanes of Formula (1) above, in essentially pure form. It is necessary in this alternate process that the cyclic polysiloxanes be in essentially pure form to obtain a high yield of the desired product.

The advantage of this alternate process over the prior process is that there can be obtained the cyclic polysiloxanes of Formula (1) above, in almost pure form by the procedure set forth in the present specification. The other reactant, of course, is water which can be easily controlled in the plant. Thus, this alternate process results in a better capability of controlling the reactants in the process, that is, the cyclic polysiloxanes and the water in the process, and is, thus, an improvement in terms of controlling the desired reaction product.

The basic advantage of the prior process, that is, the first process that was discussed above, which requires the presence of a low molecular weight silanol-stopped diorganopolysiloxane is that with such a process the hydrolyzate obtained from the initial hydrolysis of diorganodihalosilanes can be utilized directly, as has been pointed out above.

On the other hand, in the alternate process the hydrolyzate that is obtained by hydrolyzing diorganodihalosilanes is then cracked in the presence of potassium hydroxide or sodium hydroxide at temperatures above 150°C, so as to obtain the essentially pure cyclic polysiloxanes of Formula (1) above, which cyclic polysiloxanes may then be utilized in the alternate process as has been mentioned previously.

Both processes can be utilized either in batch, semicontinuous or continuous fashion. Each process results in a high yield of the desired silanol end-stopped diorganopolysiloxane products of anywhere from 1000 to 10,000,000 centipoise viscosity at 25°C and which viscosity of the desired end product can be fixed very easily by the procedures of the present process such as, for instance, the control of the amount of water present in the second alternate process. In addition, in both processes the viscosity during the reaction or equilibration period of the desired silanol end-stopped diorganopolysiloxane product of Formula (4) above, will increase at a control rate such that the reaction can be terminated at any point during the reaction cycle to obtain the desired viscosity silanol chain-stopped diorganopolysiloxane of Formula (4) above.

Irrespective of which process is utilized in the present case, it is an additional invention in the present case of a neutralization procedure for neutralizing any acid that may be left in the reaction mixture after equilibration or to neutralize the solid catalyst if such catalyst is still in the equilibration reaction mixture after the reaction has been terminated. Thus, after equilibration has been reached in either process, the equilibration reaction may be stopped by simply lowering the temperature of the equilibration mixture to room temperature. It may then be desirable to strip the low boiling cyclic polysiloxanes and other low boiling siloxanes so as to leave behind in essentially pure form the silanol chain-stopped diorganopolysiloxane of Formula (4) above.

Accordingly, it becomes necessary prior to the stripping of these low boiling cyclic polysiloxanes to remove the solid catalyst. This removal of the solid catalyst is especially necessary where the solid catalyst was present in the equilibration reaction mixture in a loose form as would be the case in a batch process as compared to the case where the solid catalyst is utilized in a packed column through which is passed the reactants continuously.

Accordingly, in either of the above processes, if the solid catalyst is utilized in loose form such that it is present in the equilibration reaction mixture after the equilibration point is reached and it is desired to strip off the low boiling siloxanes and separate them from the desired end product, then the solid catalyst may be neutralized with certain specific neutralizing agents. It should be noted that if the solid catalyst is still present in the equilibration reaction mixture when the low boiling siloxanes are to be stripped off from the desired end product, then the presence of such a catalyst will induce further reactions in the siloxane mixture so as to lower the yield of desired end product.

Accordingly, one method that was utilized in the past to remove the solid catalyst which was present in loose form in the equilibration reaction was to pass the equilibration reaction fluids through a filter, thus, filtering out the solid catalyst. Then at that point the reaction mixture could be taken to a distillation column and the low boiling siloxanes stripped off. It was found that such filtration procedures could not be incorporated effectively into a continuous process.

Accordingly, it is one aspect of the present invention that provides that after the equilibration point has been reached in the presence of the solid catalyst of the present invention, there is added to the reaction mixture sufficient amounts of a neutralizing agent selected from the class consisting of such as, for instance, NH₄OH,

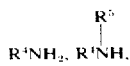

$(R^4)_4NOH$, and $(R^4)_4POH$, where $R^4$ and $R^5$ are as defined previously. After such a neutralization procedure which can be carried out effectively in a continuous manner, the product stream can then be taken directly to a distillation column and the low boiling siloxanes removed at elevated temperatures, that is, temperatures of 150° to 200°C. After the stripping of the low boiling siloxanes in the distillation column such as to result in the desired essentially pure end product of Formula (4) above, the material can be used directly in the production of one or two-part room temperature vulcanizable silicone rubber compositions wherein the neutralized solid catalyst present in the silanol chain-stopped diorganopolysiloxane of Formula (4) above, acts as a filler in the room temperature vulcanizable silicone rubber compositions.

As can be visualized, the process for forming the low viscosity silanol-stopped reactant, as well as the reaction of these two reactants to produce the final desired silanol-stopped diorganopolysiloxane of the desired viscosity can be carried out in batch fashion. It is also possible to carry out either process in a semi-continuous manner. Thus, the low viscosity silanol-stopped diorganopolysiloxane may be prepared by a continuous process and the relatively pure cyclic polysiloxanes, if needed, can also be produced by a continuous process. The two reactants of either process are pumped into the mixing kettle at the proper proportions and after having been mixed in the mixing kettle they may then be pumped to a column packed with the solid catalyst of the present invention, such as a cation exchange resin. All of the effluent from such a column is recycled back into the mixing kettle until the fluid in the mixing kettle has been reached the desired viscosity. At that time, the recycling process is halted and the volatile materials are stripped from the product after the neutralizing agent is added in the mixing kettle. At the same time, the stripping operation is being performed the catalyst column is used to process the charge from a second mixing kettle by the same process of recycling. When the desired viscosity is reached in the second mixing kettle, the recycling process is again halted and the volatile materials are stripped from the product in the second mixing kettle, thus, freeing the catalyst column again to continue this type of operation which is herein called semi-continuous.

The above process for producing the desired silanol-stopped reaction product of the present invention can be entirely continuous as distinguished from the semi-continuous process that was previously described. That is, the diorganodihalogenosilanes can be hydrolyzed in an acid medium as described previously and the silicone hydrolyzate layer separated from the water layer in a continuous manner. There may also be prepared in another part of the plant a hydrolyzate by adding diorganodihalogenosilane in the desired proportions to the dilute acid-water layer under the conditions specified previously so as to form a hydrolyzate. The silicone layer can then be separated from the acid-water layer in a continuous manner and further washed with water in a continuous manner so as to remove essentially all the free acid from it. The hydrolyzate may then be passed into a reaction chamber to which is added the necessary amount of basic catalyst, such as potassium hydroxide, and the resulting mixture equilibrated at 100°C or above to produce the desired essentially pure cyclic polysiloxanes. The equilibrium and stripping of the cyclic siloxanes can be carried out in a continuous manner. The cyclic polysiloxanes may then be recovered from the distilling column and mixed in with the low viscosity silanol-stpped diorganopolysiloxane reactant of the preferred process or mixed with water in the alternate process. It can be appreciated that the low viscosity silanol-stopped reactant may first be passed continuously through a stripping column so as to essentially removal all the cyclic polysiloxanes or, in the alternative, such cyclic polysiloxanes may be allowed to remain mixed in with the low viscosity silanol-stopped fluid. This fluid, with or without the cyclics, may then be pumped into the mixing kettle along with the essentially pure cyclic polysiloxanes. The low viscosity silanol-stopped polysiloxane, with or without the cyclics, is mixed with the essentially pure cyclic polysiloxanes in a more or less continuous manner as stated previously or in the alternate process the cyclic polysiloxanes are mixed with water. These reactants may be mixed in the mixing kettle and then pumped continuously through a column packed with the solid catalyst of the present invention. Of course, it can be appreciated that such a column can be packed with any type of solid catalyst which is defined previously. Preferably, such a column is packed with Filtrol, since it imparts only slight acidity to the desired silanol-stopped reaction product. Thus, the fluid reactants are passed through the column packed with the solid catalyst of the present invention and the effluent stream therefrom may then be neutralized with one of the neutralizing agents mentioned above and passed into a stripping column where the cyclic polysiloxanes and other impurities are stripped off at temperatures in excess of 150°C and possibly as high as 200°C.

In the case where the solid catalyst imparts acidity to the effluent from the column or is loosely mixed with the effluent, it may be necessary to add a neutralizing agent to the effluent stream containing the desired reaction product so as to neutralize the acid therein before the stripping operation. It can be imagined that in such a continuous process, and particularly a continuous process utilizing the solid catalyst of the present invention, the height of the column and the amount of packing of the solid catalyst in it, as well as the rate at which the reactant stream is pumped through such a column, will be determined by the end viscosity desired for the reaction product. That is, the size of the column and the amount of packing in it, as well as the rate in which the reactant fluids are pumped therethrough, will be such as to give the desired viscosity of the reaction product of the present invention as it leaves the column.

Thus, it can be seen that in accordance with the present invention, the entire process for producing the silanol chain-stopped reaction product of the present invention can be continuous, semi-continuous or batch. In addition, part of the process can be batch, while the rest is continuous. In addition, the initial part of the reaction for forming the low viscosity reactant fluid of the present invention and the part of the process for forming the essentially pure cyclic polysiloxanes can be batch, while the reaction of the low viscosity silanol-stopped fluid reactant reacting with the cyclic polysiloxanes can be continuous or semi-continuous.

It is particularly preferred that the latter part of the process be continuous where the low viscosity fluid reactant or water is reacted with the cyclic polysiloxane reactant.

Further, it should be mentioned that if the entire process is made continuous, the production of the silanol-stopped diorganopolysiloxane reaction product can be very economical. However, for small operations, it may be desirable to use a partly batch process and partly a semi-continuous or continuous process step for the reaction of the low viscosity fluid or water with essentially pure cyclic siloxanes in accordance with the present invention. One of the main advantages of the present process as set forth and particularly the reaction between the low viscosity fluid and the essentially pure cyclic siloxanes is that this can be done continuously which results in sizable economic benefits.

The use of a packed column in the process of the present invention to which the low viscosity fluid reactant or water and the cyclic polysiloxane fluid reactant are passed therethrough may obviate the subsequent filtration step if the catalyst is not in loose form. The only limitation in the packed column is to the rate at which the reactant fluid will pass through the packed column is the viscosity of the reaction product towards the latter part of the column when the viscosity of the fluid has increased somewhat. Thus, the packed column must be designed so even fluids of relatively high viscosity such as, 500,000 to 10,000,000 centipoise or more at 25°C can pass through the latter part of the column. In the initial part of the column there is no problem since the reactant fluids are of low viscosity.

Thus, irrespective of the type of process that is used, whether batch, semi-continuous or continuous, or a mixture of such processes, by utilizing the invention of the present invention, there can be obtained a silanol chain-stopped diorganopolysiloxane of Formula (4) above, which has less than 1.0 percent by weight of cyclic polysiloxanes, no more than 1 percent by weight of trifunctional units, and no more than 1 percent by weight of the fluid of monofunctional or other types of undesirable by-products in it, which silanol-stopped diorganopolysiloxane has a viscosity that varies from 1,000 to 10,000,000 centipoise at 25°C and which fluid meets all the exacting requirements for silanol chain-stopped diorganopolysiloxane fluid to be used as an ingredient in one-package or two-package room temperature vulcanizing silicone rubber compositions. Such a fluid that is produced in accordance with the process of the present invention preferably has from 0.01 to 0.5 weight percent of silanol groups, based on the weight of the fluid. This is the preferable concentration of silanol groups for a silanol chain-stopped fluid to be used as an ingredient in room temperature vulcanizable silicone rubber compositions. However, it must be appreciated that silanol chain-stopped fluids may be produced having a higher silanol content, that is, a silanol content of 5 or even as high as 10 percent by weight of the silanol chain-stopped diorganopolysiloxane fluid by the first process outlined above. Such high silanol content fluids may be produced merely by controlling the amount of the reactants.

Another advantage in the above process, and particularly the main process of the present invention which utilizes the solid catalyst of the present invention is that the low viscosity silanol-stopped fluid or the water react with the cyclic polysiloxanes in a controllable and measured rate. That is, the viscosity and the molecular weight of the silanol chain-stopped reaction product that is formed increases by a gradual and controlled amount so that at any point in the process the fluid can be removed from the catalyst area or the catalyst can be removed from the fluid, so as to obtain a silanol diorganopolysiloxane product of the exact desired viscosity. In no case in the reaction of the present invention does the viscosity of the reaction product increase to a very high viscosity in an uncontrolled manner as is the case when the prior art processes are used.

The silanol chain-stopped diorganopolysiloxane product of the present invention can be used to form one-package room temperature vulcanizable silicone rubber compositions by mixing it with a cross-linkinng agent such as an alkyltriacyloxysilane, a filler and a catalyst such as the metal salt of a carboxylic acid, such as dibutyl tin dilaurate. There may also be added various other types of ingredients to the silicone rubber composition such as a dialkoxydiacyloxysilane, so as to improve the adhesiveness of the resultant silicone rubber composition. For an example of the various types of additives that can be added to the silanol chain-stopped diorganopolysiloxane reaction product of the present invention, one is referred to the disclosure of the patent application of Harvey P. Shaw, entitled "Solutions of Room Temperature Vulcanizable Silicone Rubber Compositions" filed Sept. 28, 1970, having Ser. No. 76,266 which issued into U.S. Pat. No. 3,701,763. Suffice hereto state that the silanol chain-stopped diorganopolysiloxane product of the present invention is useful in all types of room temperature vulcanizable silicone rubber compositions or other types of compositions in which a silanol fluid is necessary or desired as an ingredient. Thus, the silanol chain-stopped diorganopolysiloxane fluid of the present reaction may be utilized as the basic fluid in two-part room temperature vulcanizable silicone rubber compositions. Such compositions normally comprise a silanol chain-stopped diorganopolysiloxane fluid having a viscosity anywhere from 1,000 to 10,000,000 centipoise at 25°C, to which silanol chain-stopped fluid there is added an alkyl silicate and a catalyst which again may be a metal salt of a carboxylic acid. Examples of such two-package room temperature vulcanizable silicone compositions with various self-bonding additives and other types of additives is exemplified by the disclosure in the patent application of Warren P. Lampe entitled "Room Temperature Vulcanizable Silicone Rubber Composition" filed Sept. 28, 1970, having Ser. No. 76,265 now U.S. Pat. No. 3,696,090, which patent application is hereby incorporated into the present specification by reference.

Thus, without giving any other examples in which the silanol chain-stopped diorganopolysiloxane reaction product of the present invention can be used, it suffices to state that in accordance with the process of the present invention there can be produced economically and efficiently a silanol chain-stopped diorganopolysiloxane of Formula (4) above, having a viscosity of between 1,000 to 10,000,000 centipoise at 25°C and having the necessary silanol content. Thus, for instance, the reaction product of the present invention can be used as the main ingredient fluid in non-corrosive RTV, that is, a room temperature vulcanizable silicone rubber composition, wherein the cross-linking agent is an alkoxysilane. It is not intended by these few examples listed above of the use of the silanol chain-stopped fluid of the silanol chain reaction product of the process of the present invention to limit the application to only those compositions and those uses. The silanol chain-stopped reaction product of the process of the present invention can be used as an ingredient in all compositions where a silanol chain-stopped fluid is desired of Formula (4) above, and having a viscosity of 1,000 to 10,000,000 centipoise at 25°C, and also having a silanol content that may broadly vary from anywhere from 0.01 percent by weight to 10 or more percent by weight of the fluid.

The following examples are given to merely illustrate the scope of the invention and they should not be interpreted to limit the scope of the specification or the claims of this case in any way or manner. All parts are by weight.

EXAMPLE 1

There are mixed 1212 parts of octamethylcyclotetrasiloxane which was relatively pure and 22.6 parts of a silanol-terminated diorganopolysiloxane having an average formula of $HO[(CH_3)_2SiO]_5H$ and which silanol-terminated diorganopolysiloxane-dimethylpolysiloxane has a viscosity of 30 centipoise at 25°C and is substantially free of cyclic polysiloxane and contains 0.7 weight percent based on the weight of the silanol-terminated polysiloxane of $CH_3SiO_{3/2}$ units and other impurities. These two materials are taken, thoroughly mixed together, and heated to 90°C with continual agitation. At that time there was added 70.9 parts of Filtrol 24. Filtrol 24 is a sulfuric acid-activated clay which is sold by Filtrol Corporation of Los Angeles, California. After the addition of the Filtrol, samples of the reaction mixture are removed at intervals, filtered and the bulk viscosity and volatile content of the filtrates are determined. The results are shown in Table 1 below.

TABLE I

| Time from Addn. of Filtrol 24, Mins. | Viscosity Cps. at 25°C | % Volatiles |
|---|---|---|
| 0 | 2.5 | — |
| 40 | 85 | 57 |
| 65 | 450 | 39 |
| 95 | 1128 | 22 |
| 120 | 2688 | 15 |
| 330 | 28000 | 9 |

An analysis of the sample taken at 120 minutes indicates that the sample is basically a silanol chain-stopped dimethylpolysiloxane having a viscosity of 2688 Cps. at 25°C and containing 15 percent of various types of cyclic polysiloxanes. In addition, the sample contains 0.7 weight percent based on the weight of the sample of $(CH_3)SiO_{3/2}$ units and other undesirable materials. The sample is analyzed and is found to contain 0.09 percent by weight of silanol groups based on the weight of the silanol chain-stopped dimethylpolysiloxane. Ten parts of the sample is taken, that is, of the 120 minute sample, and mixed with 0.5 parts of a cross-linking agent. The cross-linking agent was made up by mixing 4.0 parts of $CH_3COOCH_2CH_2Si(OOCCH_3)_3$, 1.5 parts by weight of di-t-butoxydiacetoxysilane and 0.05 parts of dibutyl tin dilaurate which is the catalyst. This sample, which is mixed with the above cross-linking agent is allowed to cure under atmospheric conditions at room temperature to a tack-free surface in less than 30 minutes. There was also taken a sample from the reaction mixture at 0 minutes which is indicated in Table 1. The silanol chain-stopped fluid at that point has a viscosity of 2.5 centipoise at 25°C and a ten part portion of that sample is again mixed with .5 parts of the cross-linking agent, that is, of the cross-linking agent that is used in the previous test as set forth above. The 10 part sample with the 0.5 part of cross-linking agent did not cure within 4 hours. In addition, all the above samples that are taken at the various time periods are analyzed for acidity and found to be neutral. It is, thus, indicated that the Filtrol did not impart any acidity to the desired silanol chain-stopped reaction product. A sample is also taken at 330 minutes and, as indicated in Table 1, is found to have a viscosity of 28,000 centipoise at 25°C and is found to contain 9 percent of various types of cyclic polysiloxanes. The sample is taken and all the cyclics are stripped off from the sample. It is found that the sample contained 0.04 percent by weight of silanol groups based on the silanol chain-stopped reaction product. A ten part portion of this sample is taken and mixed with 0.5 part of the cross-linking agent identified previously. The resulting mixture is allowed to cure under atmospheric conditions at room temperature to a tack-free surface in less than 30 minutes. Both the portions of the 120 minute sample and the 330 minute sample are taken and stored at room temperature. After a month period it is found that both samples still had the same viscosity, thus, indicating the stability of the silanol chain-stopped dimethylpolysiloxane formed in accordance with the practice of the present invention. As stated previously, all the samples that are obtained from 0 time to 330 minutes time in the above experiment are tested for acidity, after the removal by filtration of the Filtrol. In all cases, it is found that the sample is free of acidity.

EXAMPLE 2

There is added 2,580 parts of dichlorodimethylsilane which contains up to 0.7 percent by weight of methyltrifunctional units and up to 1 percent other impurities and such 2,580 parts of dichlorodimethylsilane are added to 7,660 parts of a 21% hydrochloric acid and water solution. This addition is carried out in 30 minutes. At the end of the addition time, the hydrolyzate is stirred for 15 minutes and is allowed to settle for 30 minutes. At the end of this 30 minutes, the water-acid layer is drained off and there is added 200 parts of water to the hydrolyzate and the water is thoroughly agitated along with the hydrolyzate. Then the agitation is stopped, the water layer and the silicone layer are allowed to be formed and the water layer is drained off. This washing procedure is repeated one more time with the same amount of water so as to remove essentially all of the free acid in the hydrolyzate layer. This hydrolysis is carried out at room temperature, that is, about 25°C. After the washing period, the hydrolyzate is analyzed and is found to contain a 70 weight percent of cyclic dimethylsiloxanes and 30 percent by weight of a silanol chain-stopped dimethylpolysiloxane polymer.

There is also present in the hydrolyzate 0.7 percent by weight of $CH_3SiO_{3/2}$ units and 1% other undesirable by-products from the foregoing hydrolysis reaction. The entire fluid, that is, a combination of the cyclic dimethylsiloxanes and the silanol-terminated dimethylpolysiloxane has a viscosity of 11 centipoise at 25°C. To 229.4 parts of this fluid, which is taken and heated with stirring to 150°C, there is added 15.3 parts of carbon black treated with sulfuric acid. The temperature is maintained at 150°C for 60 minutes after which time the batch is cooled to room temperature. At that time, there is added 20 parts of sodium bicarbonate to neutralize the reaction mixture. Then, after the neutralization procedure, the reaction mixture is filtered to remove the carbon black. The reaction mixture is then analyzed and found to contain 89.8 percent by weight of a silanol chain-stopped dimethylpolysiloxane havng a viscosity of 4200 centipoise containing 0.7 parts by weight based on the total reaction product of $CH_3SiO_{3/2}$ units and 1 percent by weight of other undesirable by-products. There is also present in the reaction mixture 8.2 percent by weight of the mixture of various types of cyclic polysiloxanes. The silanol chain-stopped diorganodimethylpolysiloxane fluid reaction product which has a viscosity of 4,200 centipoise at 25°C was found to contain 0.05 percent by weight of silanol groups based on the weight of the fluid. A 10.0 part portion of the reaction product mixture is taken and there is mixed into it 0.5 part of the cross-linking agent mixture of Example 1. The 0.5 part of the cross-linking agent mixture of Example 1 was thoroughly mixed into 10 parts of the silanol-stopped reaction product. The resulting mixture cured to a tack-free surface under atmospheric conditions and at room temperature, that is, at 25°C in 30 minutes. The curing test set forth in this example, as well as in Example 1, proved that the reaction products in accordance with the process of the present invention results in silanol-terminated dimethylpolysiloxane which is advantageously suited as an ingredient in one-package room temperature vulcanizable silicone rubber compositions and in other types of silicone rubber compositions.

EXAMPLE 3

There is taken 1203.7 parts of the hydrolyzate product of Example 2, that is, the hydrolyzate product that was obtained in accordance with the process set forth in Example 2, which hydrolysis product resulted from the hydrolysis of dichlorodimethylsilane in an acid-water mixture and which hydrolyzate product contains 70 weight percent cyclic dimethylsiloxanes and 30 weight percent of a silanol-terminated dimethylpolysiloxane and wherein as part of the 70 weight percent of the cyclic dimethylsiloxanes there is present 0.7 weight percent of trifunctional units. As stated previously in Example 2, this hydrolyzate product has a viscosity of 11 centipoise at 25°C. Thus, 1203.7 parts of this hydrolyzate product is heated to 100°C and 60 parts of the acid form of Amberlyst 15 is added to it with continuous agitation. Amberlyst 15 is manufactured by Rohm and Haas, Philadelphia, Pennsylvania and is a commercial cation exchange resin. The mixture is stirred with the Amberlyst 15 in it for a period of 118 minutes at a temperature of 100°C. At the end of that time the reaction mixture is cooled. The reaction mixture is then taken and filtered so as to remove the cation exchange resin as identified previously. This filtrate is found to be essentially free of acid. The resulting reaction product has a bulk viscosity of 2,450 centipoise at 25°C, a cyclic polysiloxane content of 13 percent by weight of the reaction mixture, and there is present 0.7 percent by weight of undesirable trifunctional units and other undesirable by-products. In the reaction mixture there is also present a silanol-terminated dimethylpolysiloxane which was present at a concentration of 85.3 percent by weight of the reaction mixture. This reaction mixture was then taken and all but 0.2 percent by weight of the cyclic polysiloxanes are stripped off. The remaining part of the reaction product that remains, that is, the product which contains about 98 percent by weight of the silanol chain-stopped dimethylpolysiloxane fluid, is tested in a typical two-package room temperature vulcanizable silicone rubber composition. To a 10 part portion of the above stripped silanol-terminated reaction product, 0.3 part of ethyl ortho silicate, 0.05 part dibutyl tin dilaurate is added and the resulting mixture is allowed to cure at room temperature under atmospheric conditions. It cured to a tack-free state in 35 minutes.

EXAMPLE 4

A hydrolyzate is prepared from methylphenyldichlorosilane by adding 119 parts of the chlorosilane to 300 parts of water. The water layer is discarded and the upper oily layer is washed free of acidity with repeated water washes. The hydrolyzate is found to be a mixture of methylphenylcyclosiloxanes and silanol-stopped methylphenylsiloxanes. To 50 parts of this hydrolyzate and 50 parts of octamethylcyclotetrasiloxane is added 5 parts of Filtrol catalyst and the mixture is heated at more than 100°C for 4 hours. The viscosity of the mixture is observed to increase during this time and, after removal of the catalyst by filtration, there is observed to be less than 15 percent cyclic materials in the filtrate. The filtrate is composed mainly of a silanol-stopped linear methylphenylpolysiloxane having a viscosity of 30,000 centipoise at 25°C. This filtrate is useful in preparing a two-part room temperature vulcanizing system in the manner of Example 3.

EXAMPLE 5

A mixture of 50 parts of tetramethyltetravinylcyclotetrasiloxane and 50 parts of a low viscosity silanol-stopped dimethylsiloxane is heated at more than 100°C for 4 hours with 5 parts of Filtrol catalyst. The viscosity of the mixture is observed to increase during this time. The Filtrol is removed from the product by filtration. The viscous filtrate is found to contain less than 15 percent cyclic siloxanes which are removed by distillation. The residual silanol-stopped linear methylvinylpolysiloxane has a viscosity of 25,000 centipoise at 25°C and is useful in preparing a one-part room temperature vulcanizing system as in Example 1.

EXAMPLE 6

A hydrolyzate is prepared from methyl(beta-cyanoethyl)dichlorosilane by adding 87 parts of the chlorosilane dissolved in 115 parts of toluene to 300 parts of water. The water layer is discarded and the upper oily layer is washed free of acid with water. The toluene is removed from the oily layer by stripping. The residual hydrolyzate is found to be a mixture of cyclic species and silanol-stopped linear species with a viscosity of 300 cps. at 25°C. One-hundred parts of this hydrolyzate is heated at higher than 90°C with 2 parts of Filtrol for 4 hours. The viscosity of the mixture is observed to increase during this time and a viscous silanol-stopped methyl(beta-cyanoethyl)polysiloxane having a viscosity of 60,000 centipoise at 25°C is isolated by filtering off the Filtrol catalyst. This polymer is useful in the preparation of a two-part room temperature vulcanizing system.

EXAMPLE 7

There is utilized 500 parts of a mixture of cyclic-polysiloxanes which have therein 5% by weight of hexamethylcyclotrisiloxanes, 75 percent by weight of octamethylcyclotetrasiloxanes, and 50 percent by weight of decamethylcyclopentasiloxanes, which mixture was heated at elevated temperatures with various amounts of water. The various amounts of water are indicated in Table 1 below. In each reaction mixture there was also present 7.5 parts of Filtrol-20, which is a commercial grade sulfuric acid activated montomorillonite clay owned by the Filtrol Corporation of Los Angeles, California. The reactants along with the Filtrol-20 were heated in a Parr model 4,521 pressure reactor at 150°C for 1 hour. The pressure bomb was then cooled to 90° to 95°C and the contents were removed and immediately filtered by air pressure with a Krueger filter. The clear, stable, viscous filtrate was analyzed to determine its volatile content and bulk viscosity. The results of the analysis both in terms of % volatiles in the final equilibration mixture, as well as the final viscosity of the desired silanol chain-stopped dimethylpolysiloxane is shown in Table 1 below:

TABLE 1

| Experiment No. | Water Added, ml. | Final Viscosity, cps[a] | % Volatiles[b] |
|---|---|---|---|
| 1 | 1.0 | 9200 | 12.0 |
| 2 | 2.0 | 7920 | 12.0 |
| 3 | 3.0 | 5040 | 11.8 |
| 4 | 4.0 | 3520 | 11.4 |
| 5 | 4.5 | 900 | 12.5 |
| 6 | 5.0 | 792 | 12.6 |
| 7 | 10.0 | 504 | 13.2 |

[a]measured by Brookfield viscometer at 25°C.
[b]measured by heating a 1.0 + 0.1g. sample in an aluminum cup at 10-20 Torr and 130-140°C for 45 minutes in a vacuum oven.

Infrared spectra confirmed the presence of silanol chain-terminated units in the equilibration polymers that were formed in the above seven experiments. As ennumerated in Table 1 above, from the results of the seven experiments there is obtained by the alternate process of the present case silanol chain-stopped diorganopolysiloxanes having the viscosities shown in Table 1 above, by reacting a cyclicpolysiloxane in essentially pure form with various amounts of water in the presence of the solid catalyst of the present invention.

EXAMPLE 8

This example is an illustration of the neutralizing step that may be utilized with the process of the present case so as to eliminate the filtration step after equilibration has been reached, imperative whether the preferred process is used or the alternate process.

There was first prepared a silanol end-stopped dimethylpolysiloxane by heating 1,500 parts of a cyclic polysiloxane mixture which cyclic polysiloxane mixture is composed of 4.53 percent by weight of hexamethyl-cyclotrisiloxane, 80.71 percent weight of octamethyl-cyclotetrasiloxane and 13.27 percent by weight of decamethylcyclopentasiloxane and said 1,500 parts of the cyclic polysiloxane mixture having therein 0.55 percent by weight of higher cyclics. To this cyclic polysiloxane mixture there is added 5 ml. of water and the mixture is heated to 150°C. Then 22.5 parts of Filtrol-20 which is a sulfuric acid activated montomorillonite clay sold by the Filtrol Corporation of Los Angeles, Calif. was added to the cyclic polysiloxane and water mixture. The mixture is agitated for 10 minutes. At the end of that time, 50 ml of 28% ammonium hyroxide was added and the first batch was stirred while the mixture cooled. A portion of this reaction mixture, that is, 785 parts of the reaction mixture, was taken and subjected to vacuum stripping at 3 ml. of mercury pressure and at a stripping temperature of 170°C. The residue from this stripping was a tan, opaque polymer weighing 678 parts, that is, there was 13.6 percent loss of weight from the original mixture that was stripped. The volatiles content of this polymer was 1.3 percent by weight and the viscosity was 1,875 centipoise at 25°C.

There was prepared a two-part RTV system from the silanol chain-stopped dimethylpolysiloxane polymer that was obtained by the above procedure. To 100 parts of such polymer there was added 40 parts of commercial grade calcium carbonate filler, 3 parts of condensed ethyl silicate, also known as ES-40 sold by Union Carbide, and 0.05 percent by weight of dibutyl tin dilaurate. This mixture was homogenized in a Baker-Perkins mixer. Then slabs were formed from the mixture and the slabs were allowed to cure at room temperature. The slabs from this two-part room temperature vulcanizable silicone composition was allowed to cure over a 24-hour period. During such curing process, the viscosity in centipoise at 25°C was 7,000. The worklife of the composition was 70 minutes. The tack-free time was 120 minutes and the Shore A Durometer after 24 hours was 44.

The cured slabs that were obtained from the above mixture were tested as to its physical properties which were as follows:

| | |
|---|---|
| Durometer, Shore A | 49 |
| Tensile, psi | 150 |
| Elongation, % | 145 |
| Tear, P.i. | 9 |
| Specific Gravity | 1.20 |

EXAMPLE 9

This example is to illustrate a control so as to make a comparison with the experiment of Example 8, where in the present example there is not utilized a neutralizing agent after the equilibration has been reached. Accordingly, to 98.5 parts of a silanol-stopped dimethylpolysiloxane having a viscosity of 2,500 cps. at 25°C and a volatiles content of less than 1.0 percent (as measured in Example 7), there was added 1.5 parts of Filtrol-20 which is the same material as was identified in Example 8, and the polymer and solid catalyst were stirred together at room temperature. Then after that point, 1.0536 parts of this mixture were heated in a 135°C vacuum oven for 45 minutes with 10 to 20 millimeters of Hg vacuum. As a result of this stripping procedure there was a loss in weight of the mixture amounting to 0.4822 parts or 45.7 percent by weight. This is the weight loss in comparison with the weight loss of 1.36 percent by weight which was incurred in the experiment of Example 8 utilizing the ammonium hydroxide treating procedure. Accordingly, as can be seen from the results of this example compared to the results of Example 8, after the equilibration point has been reached in the preferred process or in the alternate process and the solid catalyst is neutralized with a neutralizing agent such as, ammonia, the resulting volatiles that are present in the equilibration point in the reaction can be easily removed without degrading or effecting the desired silanol-terminated diorganopolysiloxane polymer that is formed by either process of the present case. On the other hand, as illustrated by the present example, if after the equilibration point is reached in either process of the present case, and the volatiles are stripped off without adding a neutralizing agent and specifically adding one of the neutralizing agents disclosed in the present case to the reaction mixture, then upon attempting to strip off the volatiles from the desired end product side reactions will occur which will lower the yield of the desired end products, that is, the high molecular weight silanol endstopped diorganopolysiloxane which is produced by the processes of the present case.

In addition, the innovation of the present disclosure, that is, utilizing the neutralizing agents of the present case, to neutralize the solid catalyst of the present case after equilibration has been reached instead of utilizing a filtration step to filter out the solid catalyst results in either of the processes of the present case being run in an inexpensive continuous fashion. On the other hand, if the filtration step is utilized in place of the neutralizing agents of the present case, then this results in the process being semi-continuous rather than continuous.

It should also be noted that the neutralizing agents for the solid catalyst in either of the processes of the present case, that such neutralizing agents are unique in the performance of this function. Other mild bases or strong bases for that matter such as, sodium bicarbonate, sodium hydroxide, potassium hydroxide, etc., have not been found to be effective neutralizing agents.

I claim:

1. A process for producing a silanol chain-stopped diorganopolysiloxane having a viscosity of 1,000 to 10,000,000 centipoise at 25°C and a silanol content ranging from 0.001 to 0.5 percent by weight where the organo groups are selected from the class consisting of monovalent hydrocarbon radicals, monovalent halogenated hydrocarbon radicals and cyanoalkyl radicals comprising (a) contacting a silanol chain-stopped diorganopolysiloxane reactant having a viscosity of 5 to 900 centipoise at 25°C containing up to 1.0 percent by weight of trifunctional siloxanes and up to 80 percent by weight of cyclic siloxanes with a cyclic polysiloxane of the formula, $$(R_2SiO)_n$$

where the organo groups and the R radicals are selected from the class consisting of monovalent hydrocarbon radicals, monovalent halogenated hydrocarbon radicals and cyanoalkyl radicals, $n$ varies from 3 to 10, in the presence of 0.1 to 75 percent by weight of the total mixture of a solid catalyst selected from the class consisting of acid activated carbon, acid activated clay, and a cation exchange resin in the temperature range of 50°C to 200°C and (b) stripping the volatiles from the reaction mixture.

2. The process of claim 1 wherein the cyclic siloxanes present in the silanol chain-stopped diorganopolysiloxane reactant have the formula, $$(R'_2SiO)_x$$

where R' is selected from the class consisting of monovalent hydrocarbon radicals, halogenated monovalent hydrocarbon radicals and cyanoalkyl radicals, $x$ varies from 3 to 10.

3. The process of claim 1 wherein the silanol chain-stopped diorganopolysiloxane reactant has the formula,

where R is as previously defined and $w$ is a whole number that varies from 2 to 500.

4. The process of claim 1 wherein the reaction temperature is preferably at 120°C to 150°C, which reaction is allowed to proceed from 1 to 3 hours.

5. The process of claim 1 wherein the diorganopolysiloxane reactant has from 0.2 to 10 percent by weight of silanol groups therein.

6. The process of claim 1 wherein the silanol chain-stopped polysiloxane product has 0.1 to 0.5 percent by weight of silanol groups therein.

7. The process of claim 1 wherein the final product has the formula,

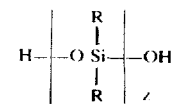

where R is as previously defined and $z$ varies from 500 to 7000.

8. The process of claim 1 wherein the catalyst has been activated with sulfuric acid.

9. The process of claim 1 wherein the catalyst comprises from 0.1 to 90 percent by volume of the reaction area.

10. The process of claim 7 wherein the acid that is used to activate the catalyst has a pH below 5.

11. The process of claim 7 wherein after the reaction has proceeded to completion, the solid catalyst is separated from the liquid reaction product and the liquid reaction product is neutralized with a base before the stripping of the liquid by-products.

12. The process of claim 1 wherein said process is carried out in a batch procedure.

13. The process of claim 1 wherein the reactants are circulated through a column containing the solid catalyst and the effluent from said column is continuously recycled through said column until the effluent reaches the desired viscosity.

14. The process of claim 11 wherein the base used to neutralize the liquid reaction product is $NaHCO_3$.

15. The process of claim 11 wherein the cation exchange resin catalyst is a sulfonated polystyrene.

16. The process of claim 1 wherein the catalyst is sulfuric acid absorbed on a porous neutral solid.

17. The process of claim 7 wherein R is selected from the class consisting of lower alkyl, alkenyl and aryl.

18. The process of claim 1 wherein R is selected from lower alkyl, alkenyl and aryl.

19. The process of claim 3 wherein R is selected from lower alkyl, alkenyl and aryl.

20. The process of claim 2 wherein R' is selected from lower alkyl, alkenyl and aryl.

21. A continuous process for producing a silanol chain-stopped diorganopolysiloxane reactant product having a viscosity of 1,000 to 10,000,000 centipoise at 25°C where the organo groups are selected from the class consisting of monovalent hydrocarbon radicals, monovalent halogenated hydrocarbon radicals and cyanoalkyl radicals comprising (a) hydrolyzing a silane of the formula $R_2SiX_2$ having up to 1.0 percent by weight of a trifunctional silane present therein of the formula, $$RSiX_3$$

with dilute acid-water mixture of a pH that varies from 0.1 to 5, where R is selected from monovalent hydrocarbon radicals, halogenated monovalent hydrocarbon radicals and cyanoalkyl radicals and X is halogen, (b) separating the silane layer from the acid-water layer to obtain a silanol chain-stopped diorganopolysiloxane reactant having a viscosity of 5 to 900 centipoise at 25°C containing up to 1.0 percent by weight of trifunctional siloxanes and up to 80 percent by weight of cyclic siloxanes; (c) hydrolyzing a silane of the formula, $$R_2SiX_2$$

where R and X are as previously defined, with a dilute acid-water mixture; (d) separating the silane layer from the acid-water layer; (e) adding a strong base to the silane layer of step (c); (f) heating the silane layer of step (e) at a temperature in the range of 125°C to 175°C and collecting overhead, cyclic polysiloxane reactants of the formula, $$(R_2SiO)_n$$

where R is as previously defined, n varies from 3 to 10; (g) contacting the silanol chain-stopped diorganopolysiloxane reactant having a viscosity of 5 to 900 centipoise at 25°C of step (b) with the cyclic polysiloxane reactant of step (f) in the presence of 0.1 to 75 percent by weight of the total mixture of a solid catalyst selected from the class consisting of acid activated carbon, acid activated clay and cation exchange resin thereon in the temperature range of 50°C to 200°C; (h) separating the reaction product from the catalyst, and (i) removing the volatiles from the reaction product which is a silanol chain-stopped diorganopolysiloxane having a viscosity of 1,000 to 10,000,000 centipoise at 25°C.

22. The process of claim 21 wherein the solid catalyst is acid activated montmorillonite.

23. The process of claim 21 wherein the catalyst comprises from 0.1 to 90 percent by volume of the reaction area.

24. The process of claim 21 wherein the silanol chain-stopped diorganopolysiloxane reaction product has a silanol content of 0.001 to 0.5 percent by weight.

25. A process for producing a silanol chain-stopped diorganopolysiloxane having a viscosity of 1,000 to 10,000,000 centipoise at 25°C and a silanol content ranging from 0.001 to 5 percent by weight where the organo groups are selected from the class consisting of monovalent hydrocarbon radicals, halogenated monovalent hydrocarbon radicals and cyanoalkyl radicals comprising reacting cyclic polysiloxanes of the formula, $$(R_2SiO)_n$$

with water at a concentration of 100 parts per million to less than 2 percent by weight where the R radicals are selected from the class consisting of monovalent hydrocarbon radicals, halogenated monovalent hydrocarbon radicals and cyanoalkyl radicals, n varies from 3 to 10, in the presence of 0.1 to 75 percent by weight of the total mixture of a solid catalyst selected from the class consisting of acid activated carbon, and acid activated clay in the temperature range of 50°C to 200°C.

26. The process of claim 25 wherein the formula of the cyclic polysiloxane, n varies from 3 to 5.

27. The process of claim 25 wherein after said reaction has been completed, futher comprising filtering out said solid catalyst and then stripping out of the reaction mixture the remaining cyclic polysiloxanes.

28. The process of claim 25, wherein after said reaction has been completed, further comprising adding to the reaction mixture a neutralizing agent for the solid catalyst selected from the class consisting of $NH_4OH$,

$(R^4)_3NOH$, and $(R^4)_4POH$, where $R^4$ and $R^5$ are selected from the class consisting of alkyl radicals of 1 to 8 carbon atoms, alkenyl radicals of 2 to 8 carbon atoms, cycloakyl radicals of 4 to 8 carbon atoms and mononuclear aryl radicals, and then stripping off the remaining cyclic polysiloxanes from the reaction mixture.

29. The process of claim 25 wherein the water is present at a concentration of 0.05 percent by weight to less tha 2 percent by weight.

30. The process of claim 25 wherein the reaction temperature is at 120°C to 100°C which reaction is allowed to proceed for 1 to 3 hours.

31. The process of claim 25 wherein said solid catalyst has been activated with sulfuric acid.

32. The process of claim 25 wherein said catalyst comprises from 0.1 to 90 percent by volume of the total mixture.

33. The process of claim 25 wherein the acid that is used to activate said solid catalyst has a pH below 5.

34. The process of claim 25 wherein the reactants are circulated continuously through a column containing said solid catalyst such that effluent emanating from said column is the desired product.

35. The process of claim 25 wherein said catalyst is sulfonic acid absorbed on a porous neutral solid.

36. The process of claim 25 wherein the R radical is selected from the class consisting of lower alkyl, alkenyl and aryl.

37. The process of claim 25 wherein said solid catalyst is acid-activated montomorillonite.

38. The process of claim 1 wherein prior to stripping the volatiles from the reaction mixture, further comprising adding to the reaction mixture a neutralizing agent for the solid catalyst selected from the class consisting of $NH_4OH$, $R^1NH_2$, $$R^4NH_2$$

$(R^4)_4NOH$, and $(R^4)POH$, where $R^1$ and $R^5$ are selected from the class consisting of alkyl radicals of 1 to 8 carbon atoms, alkenyl radicals of 2 to 8 carbon atoms, cycloalkyl radicals of 4 to 8 carbon atoms and mononuclear aryl radicals and then stripping off the remaining cyclic polysiloxanes from the reaction mixture.

* * * * *